F. L. McGAHAN.
ALLOYING FURNACE.
APPLICATION FILED APR. 21, 1917.

1,290,268.

Patented Jan. 7, 1919.
6 SHEETS—SHEET 1.

INVENTOR:
Frederick L. McGahan,
BY Hugh K. Wagner
ATTORNEY

F. L. McGAHAN.
ALLOYING FURNACE.
APPLICATION FILED APR. 21, 1917.

1,290,268.

Patented Jan. 7, 1919.
6 SHEETS—SHEET 2.

INVENTOR:
Frederick L. McGahan,
BY
Hugh K. Wagner
ATTORNEY.

F. L. McGAHAN.
ALLOYING FURNACE.
APPLICATION FILED APR. 21, 1917.

1,290,268.

Patented Jan. 7, 1919.
6 SHEETS—SHEET 3.

INVENTOR:
Frederick L. McGahan,
By
Hugh K. Wagner,
ATTORNEY

F. L. McGAHAN.
ALLOYING FURNACE.
APPLICATION FILED APR. 21, 1917.

1,290,268.

Patented Jan. 7, 1919.
6 SHEETS—SHEET 4.

INVENTOR:
Frederick L. McGahan.
BY
Hugh H. Wagner
ATTORNEY

UNITED STATES PATENT OFFICE.

FREDERICK L. McGAHAN, OF LOS ANGELES, CALIFORNIA.

ALLOYING-FURNACE.

1,290,268.   Specification of Letters Patent.   Patented Jan. 7, 1919.

Application filed April 21, 1917. Serial No. 163,624.

*To all whom it may concern:*

Be it known that I, FREDERICK L. Mc-GAHAN, a citizen of the United States, residing at the city of Los Angeles, in the county of Los Angeles and State of California, have invented certain new and useful Improvements in Alloying-Furnaces, of which the following is a specification.

This invention relates to apparatus for treating ores, and its primary object is to provide an apparatus in which the ore is smelted and also in which the values may be recovered from the fumes that pass from the furnace within which the smelting of the ores takes place.

Other objects and advantages will be apparent in the course of the following description, taken in conjunction with the accompanying drawings, and the particular features of novelty will be pointed out in the appended claims.

In the drawings, in which like numbers of reference denote like parts wherever they occur.

Fig. 3ª is an end view of the sprocket wheel that turns the grate shown in Fig. 2;

Figure 1:
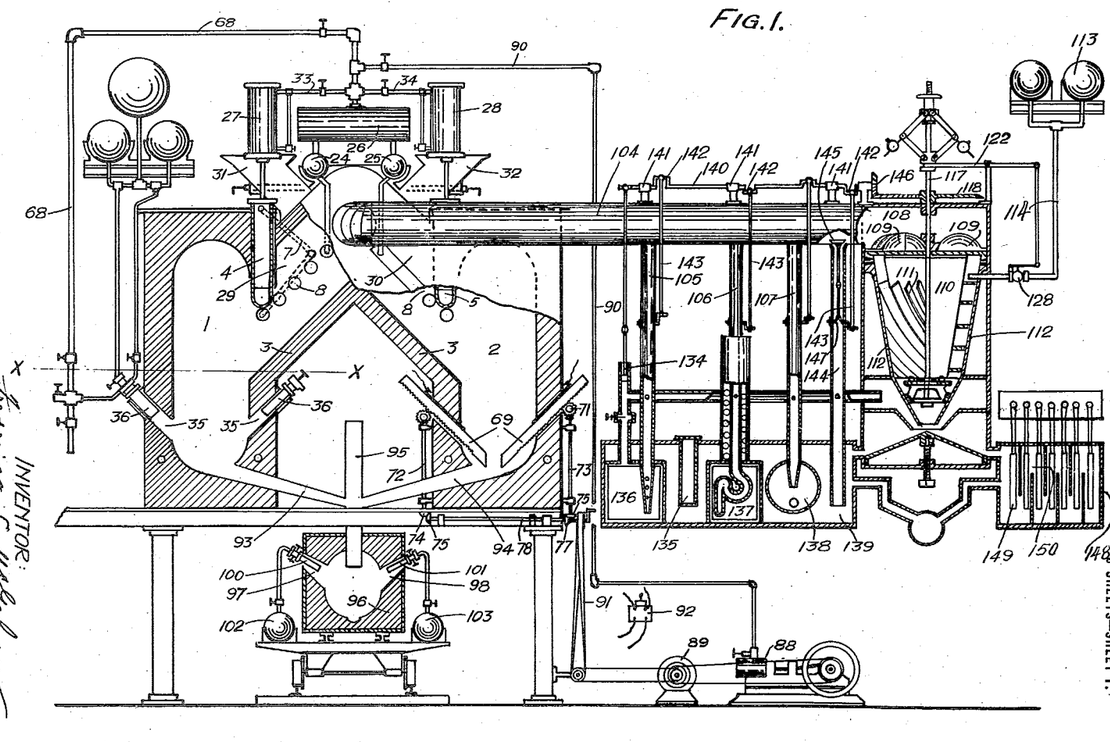
Figure 1 is a side view of a furnace, certain parts being shown in section.

Referring now more particularly to the drawings, smelting chambers 1 and 2 are preferably upstanding and substantially cylindrical in shape. Inclined inclosures 3 preferably join the chambers at an angle of approximately forty-five degrees. Positioned above the inclosure 3 are hollow sliding doors 4 and 5 adapted to close the upper part of the openings between the chambers and inclosures. These doors are so constructed that water may be pumped therein through an opening 6, as will be described hereinafter with reference to Fig. 18.

Figures 2, 3, 3A, 9, 12, 13, 14, 17:
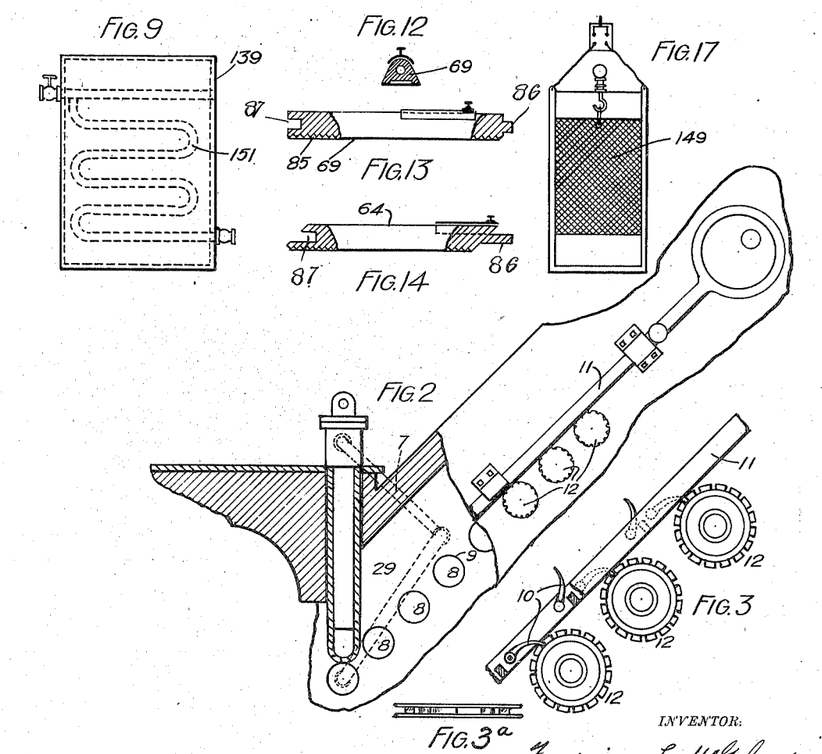
Fig. 2 is an enlarged side view, partly in section, of the water cooled gate and grate associated with the furnace.
Fig. 3 is an enlarged side view of certain parts illustrated in Fig. 2.
Fig. 9 is an end view of Fig. 8.
Fig. 12, Fig. 13, and Fig. 14 illustrate the carbon electrodes.
Fig. 17 is an enlarged view of a cathode.
Figures 4, 6:
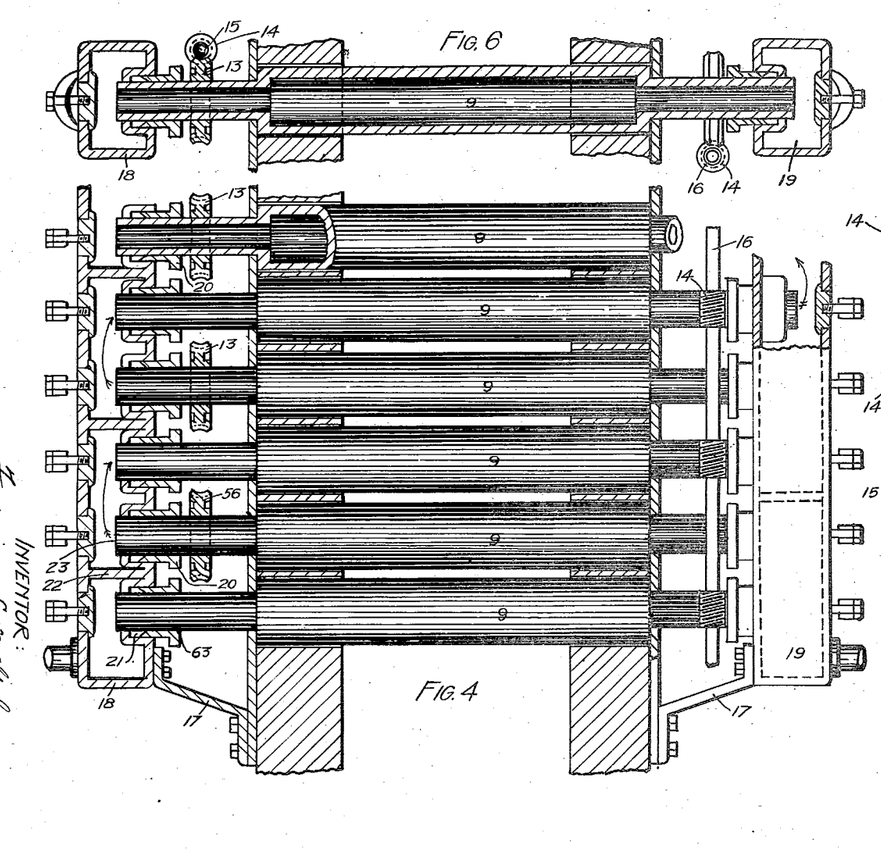
Fig. 4 is a front view of the water grate, certain parts being shown in section.
Fig. 6 is an end view, partly in section, of certain parts shown in Figs. 4 and 5.
Figure 5:
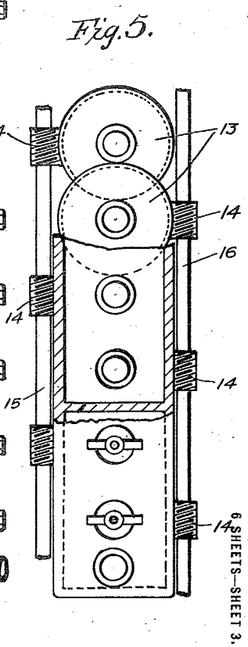
Fig. 5 is an end view of Fig. 4 with certain parts broken away.

Connected to each of the doors 4 and 5 by means of jointed pipe 7 (see Fig. 20) is a grating 8 formed of water tubes 9. These pipes 7 serve to maintain a water-conducting conduit between doors 4 and 5 and grating 8, while permitting the necessary movement of the doors. These tubes are revoluble, and as shown in Figs. 2 and 3 may be revolved by means of pawls 10 secured to a cam-actuated rod 11 and engaging the teeth of ratchets 12. Another manner of revolving these tubes 9 is shown in Figs. 4, 5, and 6. A system of worm gears 13, driven by worms 14, is mounted on shafts 15 and 16. The shafts 15 and 16 are driven by any suitable means. Secured to the roasting portion of the furnace are angle irons 17 which support water-boxes 18 and 19.

The grate bars 9 terminate in water-boxes 18 and 19 at points 20 through stuffing-box glands 21, which form metallic bearings for the said grate. Fig. 6, being an end view of Fig. 5, shows a water tube 9 with the ends thereof extending into water-boxes 18 and 19. When the water is pumped into the first water-box, or flows from the sliding door to the first water-box, it travels through one of the tubes 9 to the opposite water-box, which is provided with a partition 22; the water goes back through the next tube 9, as shown at 23; then in the direction of the arrow continues through the grate tubes until it reaches water-drums 24 and 25. When it reaches the drums 24 and 25 the heat in the furnace has practically converted the water into steam, which flows into a steam drum 26.

Figures 18, 19, 20:
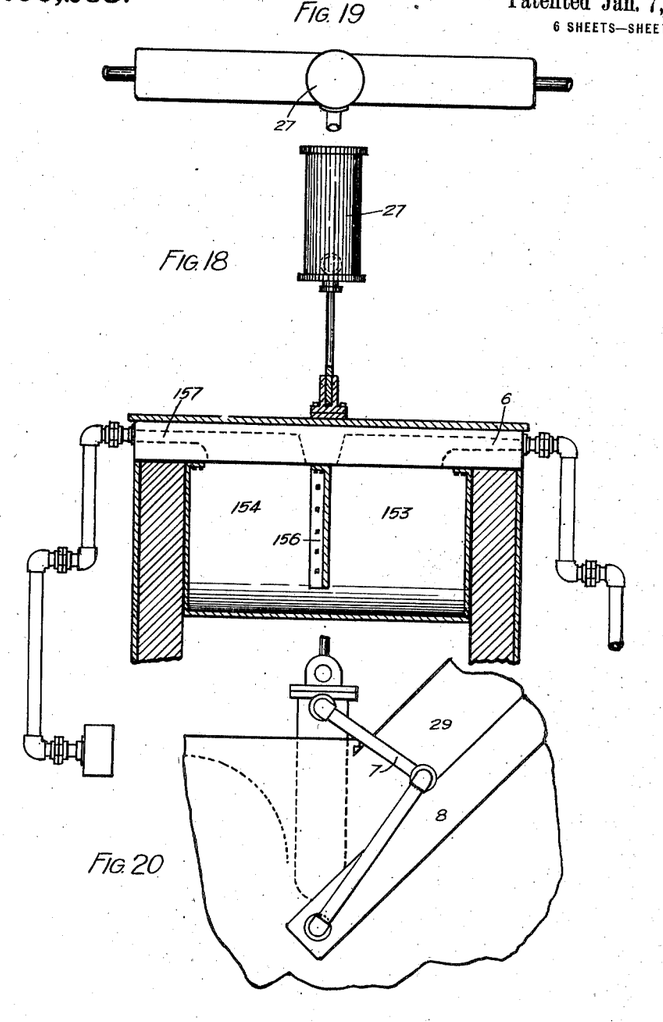
Fig. 18 is an enlarged view, partly in section, of the water gate showing the manner of application of water thereto.
Fig. 19 is a top view of Fig. 18.
Fig. 20 is an end view of the water gate.

The sliding doors 4 and 5 are preferably raised by means of pneumatic or steam hoists 27 and 28, respectively, as shown in Fig. 18. The positioning of the gratings 8 form roasting chambers 29 and 30, which are adapted to receive a charge of ore from hoppers 31 and 32, respectively.

Positioned between the pneumatic hoists 27 and 28 is a steam drum 26 of any ordinary construction, to which is connected water-drums 24 and 25 mentioned above. The steam drum 26 is connected to hoists 27 and 28 by pipes 33 and 34.

Extending laterally into the smelting chamber 1 is a plurality of combustion chambers 35, which are preferably arranged at an angle of approximately forty-five degrees to the smelting chamber 1. These combustion chambers 35 are each provided with a fuel injector 36 (see Fig. 11).

Figure 10:
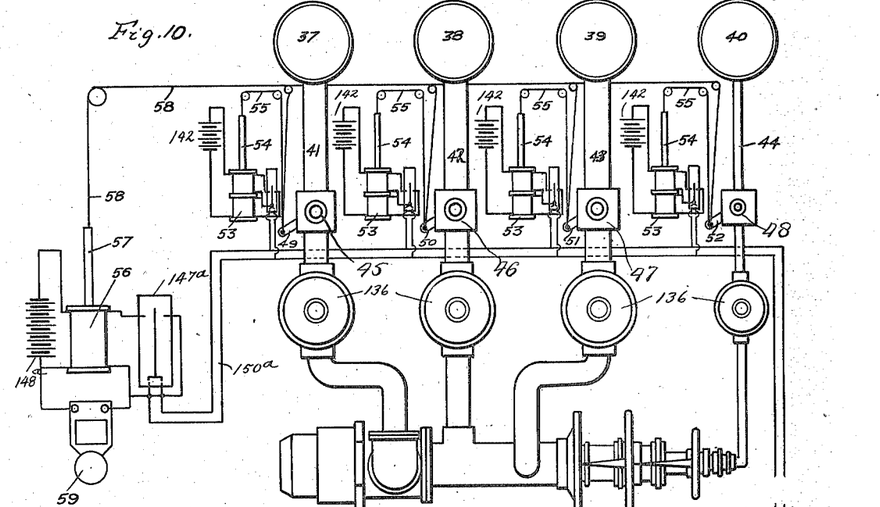
Fig. 10 illustrates a series of gasometers.

Fig. 10 illustrates a system of longitudinal gasometers 37, 38, 39, and 40, which are substantially L-shaped; the vertical portion of the same being of ordinary construction, in order that the pressure may be held at certain ounces or pounds until all gas is out of the vertical portion. The gasometers 37 and 38 are preferably used for oxygen and hydrogen, respectively, and the gasometers 39 and 40 are used for liquid hydro-carbon and fluxing gases, respectively. Connected to the gasometers 37, 38, 39, and 40 are tubes 41, 42, 43, and 44, respectively. These tubes are each provided with a valve, as shown at 45, 46, 47, and 48, which are controlled by levers 49, 50, 51, and 52, respectively. Associated with this system of gasometers is an electric circuit provided with solenoids 53 and cores 54. To each of the cores 54 is secured a cable 55, the other end of which engages the lever of the above-mentioned valves. The large solenoid 56 with a core 57 is provided, to which core is a secured a cable 58, which is likewise secured to the valve levers above mentioned.

It is to be observed that, should one of the valves not operate correctly, its valve lever would rise and the associated core will be permitted to fall and engage its solenoid and complete a circuit with the main solenoid 56 through 150ª, 147ª and 148ª. Also, as the lever rises, the cable 58 will allow the core 57 to engage solenoid 56 and give an alarm, as shown herein by a bell or gong 59.

Figure 11:
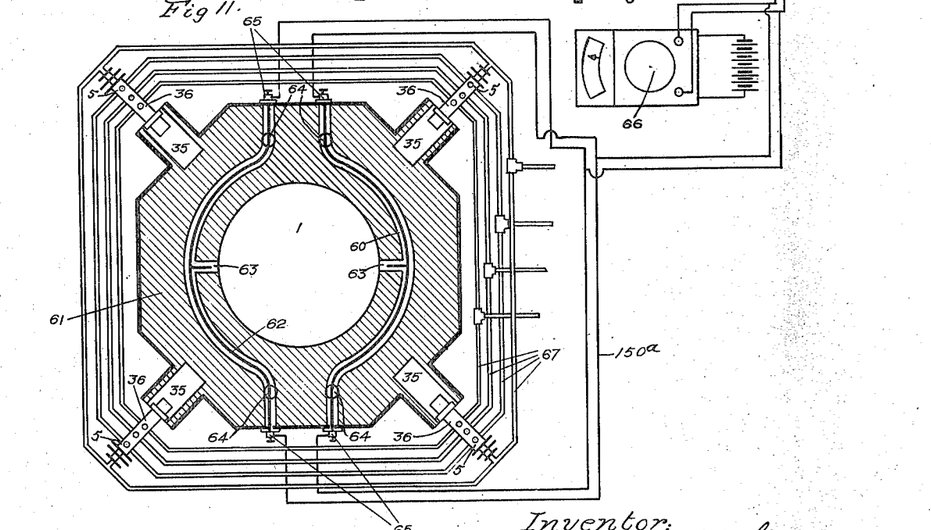
Fig. 11 is a view taken on the line x—x in Fig. 1.

Fig. 11 illustrates a view on the line $x$—$x$ in Fig. 1 through the crucible base of the vertical chamber 1. A tube 60 formed of resistance material, such a platinum, is cast into the lining 61 of the furnace, and a wire 62, which may be of platinum, is positioned in the said tube and spaced from the sides of the tube by suitable means. The openings 63 are from the chamber 1 to the tube 60. Suction tubes 64 lead to the tube 60 in order that the heat may be drawn from the chamber 1 through the openings 63 to the tube 60 and expand the wire 62. The wire 62 is connected to the poles 65 of the tube 60, and the poles 65 are connected to a pyrometer 66. When the wire 62 is expanded to a predetermined degree, it contacts with and completes a circuit through corresponding poles 65 to actuate pyrometer 66.

A plurality of pipes 67 is connected to the fuel injectors 35 and the gasometers by any suitable means. It will be noted that by setting the levers 49 and 50 the proper amount of oxygen and hydrogen may be admitted to make an illuminating flame. After the flame has been established the lever 51 may be set to allow the admittance of hydrocarbon with the oxygen and hydrogen, thus producing a heat-making flame. The gasometer 40, as above mentioned, contains fluxing gases, and the admittance of such gases is permitted by the valve controlled by lever 52.

From the foregoing it will be understood that each fuel injector 35 has communication with the several gasometers, so that the contents of any or all of said gasometers may be delievered to the fuel injectors; so that the ore in the smelting chambers may be subjected to the action of the various gases to secure the desired results.

The ore is initially reduced in the chambers 29 and 30 and then passes into the smelting chambers as hereinbefore set forth. During the time that the ore is in the smelting chambers it may be subjected to any desired treatment with the contents of the gasometers, and by placing different metals in the opposite smelting chambers and connecting both of these smelting chambers with a common receptacle such as ladle 96 I am enabled to produce alloys of varying kinds.

As shown in Fig. 1, a pipe 68 is, also, connected to the fuel injectors from the steam drum 26.

Figure 15:
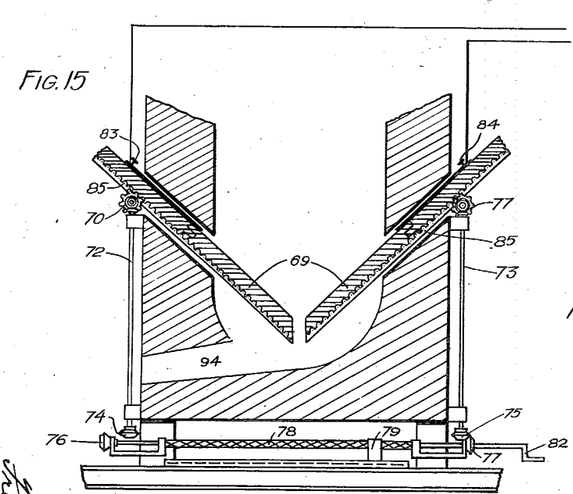
Fig. 15 is an enlarged sectional elevation of a portion of the furnace showing in detail the carbon electrodes and the operating means therefor.

Extending into the smelting chamber 2 and disposed at an angle of approximately forty-five degrees thereto are carbon electrodes 69. As shown in Fig. 15, the electrodes are adjusted to proper position by gears 70 and 77. These gears are constructed of non-conducting material and are mounted at one end of shafts 72 and 73, respectively. The shafts 72 and 73 carry at their other ends beveled gears 74 and 75, either of which is adapted to mesh with gears 76 or 77 at the ends of a shaft 78. As clearly shown in Fig. 16 a projection 79 provided with a tongue 80 is secured in any suitable position where the tongue will engage the threads 81 of shaft 78. The arc of the furnace is made by means of a crank 82, and the arc may be maintained by such crank by an operator or charger of the furnace. The electric contacts to the carbon electrodes are numbered 83 and 84 in the drawings.

Figure 16:
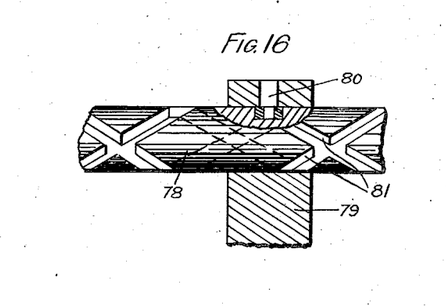
Fig. 16 is an enlarged view of certain parts shown in Fig. 15.

When an electric current has been supplied through the electric contact 83, the shaft 78 is put into motion through the tongue 80, which revolves along the shaft 78 by the tongue passing the double screw portion 81 of shaft 78 from one end to the other. One electrode is held still while the other feeds approximately three-eighths of an inch, and vice versa, by the movement of the tongue-holder. The arc is always held in the center of the crucible base of the smelter, so that the heat in the furnace is never affected by the replacing of the electrodes.

The construction of the carbon electrodes is clearly shown in Figs. 12, 13, and 14. Fig. 12 is an end view of one of the electrodes. As shown in Fig. 15, each electrode is provided with a plurality of teeth 85, which mesh with the ratchets 70 and 71.

The electrodes are made of any suitable carbonaceous material, and each is formed into a male portion 86 and a female portion 87, so that the carbon forms a continuous feed.

A steam engine 88 is provided, which operates a dynamo 89. A pipe 90 conducts steam from the steam drum 26 to the engine 88. The dynamo 89 rotates the shaft 78 by suitable means 91. A switch 92 is used to introduce an electric current from the dynamo 89 to the electrodes.

Tap-holes 93 and 94 from the smelting chambers 1 and 2 are provided, and a release pipe 95 extends into a ladle 96. The ladle 96 is provided with combustion chambers 97 and 98, which contain fuel injectors 100 and 101. The fuel injectors 100 and 101 receive their supply of fuel from tanks 102 and 103.

Leading from the roasting chambers 29 and 30 is a vacuum draft stack 104, to which are connected the vacuum tubes 105, 106, 107, and 144. The draft stack 104 terminates in a vacuum chamber 108 of a condenser, which is substantially the same as that shown in my previous Patent 1,217,100, dated February 20, 1917. The vacuum chamber 108 contains a number of fan blades 109 and a revolving cylinder 110. The cylinder 110 is provided with a plurality of spiral blades 111, which act as cylinder piston blades and revolve the cylinder 110 in its casing 112 hydraulically. Water tanks 113 are secured at any suitable place, and are adapted to inject water through pipe 114 to the cylinder 110 and rotate the same within its casing 112 on roller or ball-bearings 115 and 116.

A vertical shaft 117 connected to the cylinder extends upwardly through and above the head of the casing and has secured thereto a gear 118 and a slidable sleeve 119 provided with an annular groove 120, which is adapted to receive the end 121 of the yoke 122. Positioned above sleeve 119 is a sleeve 123, to which is secured governor arms 124 provided at their ends with the customary governor balls 125. The balls 125 are held at an angle to the shaft 117 by means of connecting rods 126. The yoke 122 is pivoted in a bracket 127 and is connected to a valve 128 in pipe 114, as shown in Fig. 1, and the operation of the valve is controlled by the governor above described in a manner similar to that described in the patent above referred to.

Figure 7:
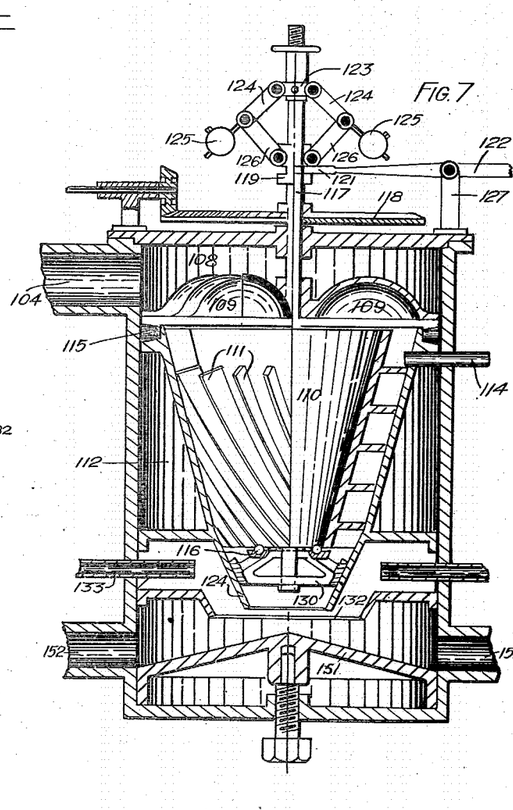
Fig. 7 is a sectional elevation of the condenser.

The lower end of the condenser is substantially funnel-shaped, as shown at 129, and is provided with a spider support 130. The lower portion of the condenser is provided with an adjustable deflector 131 and a nozzle 132. As shown in Fig. 7, this deflector may be adjusted by means of a screw. A tube 133 extends from the vacuum chambers 105, 106, 107, and 144 and the vacuum pump 134. Pipes 152 carry off water that passes through the nozzle 132 onto the deflector 131.

An ice box 135 is provided for cooling purposes. Acid-holding receptacles 136, 137, and 138 together with the ice box 135 are contained in a tank 139. As shown in Fig. 1, the vacuum tubes extend into the tank 139.

A crank shaft 140 is journaled in bearings 141 and is provided with a plurality of cranks 142 to each of which is secured a rod 143 which controls a valve 145 in each vacuum tube. Secured to the end of shaft 140 is a beveled gear 146 which meshes with the gear 118 above described.

As shown in Fig. 1, a crank is secured in each vacuum tube, one end of which is connected to the rod 143. It is evident that as the shaft 140 rotates, the rod 143 will be raised, and will rotate the crank 147 and open valve 145.

An electrolytic cell 148 is provided, which, as is customary, is provided with cathodes 149 and anodes 150. A shown in Fig. 17, the cathodes 149 are set in a horse-shoe magnet, and are formed of gauze wire material, which is dipped into a suitable filling upon which the metals will be deposited by electrolysis.

Figure 8:
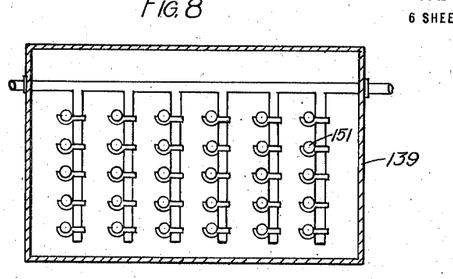
Fig. 8 is a side elevation of the ice tank associated with the furnace.

Figs. 8 and 9 are side and end views of the tank 139 into which the tubes 105, 106, 107, and 144 extend and deposit matter from said tubes into the receptacles provided therefor. The tank 139 is provided with ammonia gas tubes 151 for the purpose of cooling. This furnace itself creates sufficient ammonia salts from the hydrogen and sulfuric carbon dioxid to produce as a by-product from the liquor all the ammonia gases required. The showing in Figs. 8 and 9 is to indicate that tank 139 is provided, where required, with cooling coils 151 such as are common in refrigerating apparatus. These coils are not shown in Fig. 1, but it is to be understood that the invention contemplates the employment of a cooling medium in tank 139 whenever found necessary or desirable.

Fig. 18 denotes a view partly in section of the water gate 4. As above described, the water enters through the opening 6 and passes into the chamber 153 at the water gate. As shown in this figure, the gate is divided into chambers 153 and 154 by a partition 156. The water passes from the water gate through the opening 157 and through its connected pipes to the water grate tubes 9 and then through the grate tubes in the manner hereinbefore described.

Fig. 19 denotes a top view of Fig. 18, and Fig. 20 shows in detail the connection of the water grate with the water gate by means of jointed pipes 7.

From the foregoing description it will be seen that the operation of the apparatus is as follows:

In making a steel casting or a steel ingot for any purpose, a charge of ore is inserted through the hoppers 31 and 32 upon the grates 8. As described, an oil fire with air or steam and the proper reducing gases may be used to reduce and melt the roasted ore which has fallen through the grates into the smelting chamber 1. The molten metal will be held in the lower part of the smelting chamber until the tap-holes 93 and the release pipe 95 permits it to flow into the ladle 96. Any slag that may be formed is removed through tap holes (not shown) as is customary, and gaseous impurities rise out of the molten metal and are withdrawn therefrom by means of the vacuum draft.

Tungsten, cobalt, or vanadium may be placed, if desired, in the electric side of the furnace, and they may likewise be converted into a liquid form by means of the electrodes and held in the crucible base of the smelting compartment 2. This molten material is boiled and every impurity withdrawn therefrom by means of the vacuum draft just as in the case above described regarding molten iron. The temperatures of the furnace are known by means of the pyrometer, as explained in connection with Fig. 11.

The operator or charger of the furnace will know by reason of the gasometers when the heat of the furnace is at the proper amount to mix the hardening material with the iron. The blow-pipes in the ladle 96 will hold the iron in its molten state until a perfect alloy is formed.

In forming alloys of bronze and brass and gun metals with lead, antimony, tin, and zinc, on the one side, and copper, silver, and iron on the other side, the operation is practically the same as with the alloying of steel. In other words, when it is desirable to form any alloy of metals, one of the metals may be placed in one of the smelting chambers and the other of the metals in another of the smelting chambers, and the two may be treated to any desired extent and then permitted to join in the ladle 96.

It is obvious that many commercial products can be made from the operation above described. For instance, if the first metal to be melted from the charge of ore should be lead, it will run down the inclosure 3 into the crucible base of the vertical chamber 1 and, if necessary or desired, into the ladle 96, from which place it is poured into a pit while in its molten state through screens arranged therein to form shot of different sizes. It may, also, be cast from the ladle in the same molten state into a mold for making plumbers' traps or it may be dropped into a ram for pressing it into lead pipe.

The operation of the condenser as above mentioned is substantially the same as that referred to in my Patent 1,217,100, dated February 20, 1917. The vacuum draft stack 104 will draw the gangue of the ore from the roasting chambers toward the vacuum chamber 108 of the condenser. The gases passsing through the vacuum stack 104 are discharged through vacuum tubes 105, 106, 107, and 144 into the tank 139 in their respective receptacles. The remainder of the gases which pass into chamber 108 of the condenser are caught by the revolving blades 109. As above described, the cylinder 110 with its associate spiral blades is rotated by means of water being injected therein through pipe 114. The water from the pipe 114 is directed against the spiral blades 11 of the cylinder 110. The cylinder 110, because of its frictionless bearings, will rotate at a high speed and in the event that the speed of the cylinder should become excessive, the centrifugal force will cause the governor balls 125 to swing outwardly and raise the sleeve 119, which will, also, raise yoke 122 and control valve 128. It is seen, therefore, that the operation of the valve 128 may be regulated by changing the position of the sleeve 119 on shaft 117.

In the operation of the spreader or cylinder, the water from its periphery will be discharged at the bottom through the funnel-shaped opening 129 through the nozzle 132 and onto the deflector 151, from which it passes out through the openings 152. It will be observed that as the water ejects from the funnel-shaped opening 129 a suction will be created through pipe 133. It is, also, to be noted that the gases which enter chamber 108 are carried by means of the fan blades 109 to the cylinder 110 and are thoroughly intermingled with the water and are carried thereby through the funnel-shaped opening 129. Upon the rotation of the cylinder 110 the gear 118 which is secured to shaft 117 will rotate, thereby rotating gear 146 and crank shaft 140. As above described, the rotation of crank shaft 140 controls the valves 145 and the vacuum pump 134.

As above described, an electrolytic cell is provided, the operation of which is obvious.

Ordinary smelting furnaces all make slag piles, while this furnace, constructed as it is, besides the metals, puts the gangue of all ore into finished by-products as alloys or compounds, i. e., into useful material, instead of a slag pile.

The following features are believed to be entirely novel and secure results not obtainable with any other apparatus; the provision of the fuel injectors connected so that either oxygen or hydrogen or liquid hydro-carbon may be fed thereto with the carbon addition to change the flame to a heat flame.

These elements act to liberate lead from the ore, which lead, running down out of the smelter as refined lead pigment, can at once be cast into shot, molded into plumbers' traps, forced into lead pipe, or treated in any other desired manner.

Further, to illustrate: Take the other side of the furnace, with the electric carbons therein, and with the copper ore therein, the copper will run out of that side of the furnace and sufficient of the copper and lead put together will form an alloy. There is no known furnace that forms this kind of an alloy at one and the same time and puts all the gangue of the lead ore and the copper ore into building materials, such as terra cotta, prisms, tiling, and all other necessary fireproof building materials of the highest class, with a little clay mixing of cements, much better than the Portland cements, as they carry the lime and silicate portions therewith, to be mixed with the clays of the other portions of the slag material.

I claim:

1. In an apparatus for treating ores, a smelting chamber, a roasting chamber disposed above said smelting chamber, a slidable water-cooled gate separating the smelting chamber and the roasting chamber, a plurality of water-cooled grate tubes dividing the roasting chamber into two compartments, a steam drum, water drums connected to said steam drums, means for supplying water to the gate and grate, and pipes connecting the gate and grate with the water and steam drums.

2. In an apparatus for treating ores, a smelting chamber provided with a plurality of fuel injectors, a second smelting chamber provided with carbon electrodes, means having oppositely inclined faces separating the two smelting chambers, roasting compartments positioned above the inclosure and communicating with said smelting chambers, water-cooled grate tubes dividing the roasting chamber and the two compartments, and hollow slidable water-cooled gates positioned above the inclosure and separating one of the roasting compartments from the smelting chambers.

3. In an apparatus for treating ores, a smelting chamber provided with a plurality of fuel injectors, a second smelting chamber provided with carbon electrodes, means having oppositely inclined faces separating the two smelting chambers, roasting compartments positioned above the inclosure and communicating with said smelting chambers, water-cooled grate tubes dividing the roasting chamber and the two compartments, hollow slidable water-cooled gates positioned above the inclosure and separating one of the roasting compartments from the smelting chambers, a ladle below the smelting chambers, and means permitting molten metal to flow from the smelting chambers into said ladle.

4. In an apparatus for treating ores, a smelting chamber provided with a plurality of fuel injectors, a second smelting chamber provided with carbon electrodes, means having oppositely inclined faces separating the two smelting chambers, roasting compartments positioned above the inclosure and communicating with said smelting chambers, water-cooled grate tubes dividing the roasting chamber and the two compartments, hollow slidable water-cooled gates positioned above the inclosure and separating one of the roasting compartments from one of the smelting chambers, a ladle below the smelting chambers, means permitting molten metal to flow from said smelting chambers into said ladle, and means for heating said ladle.

5. In an apparatus for treating ores, in combination a smelting chamber provided with a plurality of fuel injectors, a second smelting chamber provided with carbon electrodes, means having oppositely inclined faces separating the two smelting chambers, roasting compartments positioned above the inclosure and communicating with said smelting chambers, water-cooled grate tubes dividing the roasting chambers into two compartments, a sliding door separating the smelting chamber and the roasting compartment, a condenser, a vacuum draft stack leading from the roasting compartments to the condenser, vacuum draft tubes, an ice-tank receiving the ends of said draft tubes, valves in said draft tubes, and means connected to the condenser for operating said valves.

In testimony whereof I hereunto affix my signature.

FREDERICK L. McGAHAN.